United States Patent
Varagniat et al.

(10) Patent No.: US 8,461,269 B2
(45) Date of Patent: *Jun. 11, 2013

(54) ELASTOMERIC COMPOSITION REINFORCED WITH A FUNTIONALIZED NON-AROMATIC VINYL POLYMER FILLER

(75) Inventors: Franck Varagniat, Ceyrat (FR); Sylvie Gandon-Pain, Nohanent (FR); Arnaud Lapra, Saint-Saturnin (FR)

(73) Assignee: Micheln Recherche et Technique S.A., Granges-Paccot (CH)

( * ) Notice: Subject to any disclaimer, the term of this patent is extended or adjusted under 35 U.S.C. 154(b) by 810 days.

This patent is subject to a terminal disclaimer.

(21) Appl. No.: 12/309,076

(22) PCT Filed: Jun. 29, 2007

(86) PCT No.: PCT/EP2007/005772
§ 371 (c)(1),
(2), (4) Date: Sep. 22, 2009

(87) PCT Pub. No.: WO2008/003435
PCT Pub. Date: Jan. 10, 2008

(65) Prior Publication Data
US 2010/0022714 A1    Jan. 28, 2010

(30) Foreign Application Priority Data
Jul. 6, 2006 (FR) .................... 06 06169

(51) Int. Cl.
*C08L 21/00* (2006.01)
*C08L 33/08* (2006.01)
*B60C 1/00* (2006.01)

(52) U.S. Cl.
USPC ............ 525/209; 525/222; 525/232; 525/479

(58) Field of Classification Search
USPC ............... 525/191, 209, 222, 223, 232, 479
See application file for complete search history.

(56) References Cited

U.S. PATENT DOCUMENTS

| | | |
|---|---|---|
| 3,520,838 A | 7/1970 | Burke |
| 6,774,255 B1 | 8/2004 | Tardivat et al. |
| 7,217,751 B2 | 5/2007 | Durel et al. |
| 7,300,970 B2 | 11/2007 | Durel et al. |
| 7,488,768 B2 | 2/2009 | Tardivat et al. |
| 7,491,767 B2 | 2/2009 | Durel et al. |
| 7,820,771 B2 * | 10/2010 | Lapra et al. ............ 525/479 |
| 2003/0125467 A1 | 7/2003 | Akema et al. |
| 2005/0228134 A1 | 10/2005 | Xie |
| 2009/0270558 A1 * | 10/2009 | Gandon-pain et al. ........ 525/190 |

FOREIGN PATENT DOCUMENTS
WO    WO 2006069792 A1 *  7/2006

OTHER PUBLICATIONS

Tissot, Isabelle et al., "Hybrid Latex Particles Coated with Silica," *Macromolecules*, 2001, pp. 5737-5739, vol. 34, American Chemical Society.
Bourgeat-Lami, E. et al., "Synthesis and Characterization of SiOH-Functionalized Polymer Latexes Using Methacryloxy Propyl Trimethoxysilane in Emulsion Polymerization," *Macromolecules*, 2002, pp. 6185-6191, vol. 35, American Chemical Society.
Tobita, H. et al., "Microgel formation in emulsion polymerization," *Polymer*, 2000, pp. 481, vol. 41, Elsevier Science Ltd.
International Search Report of International Application No. PCT/EP2007/005771 mailed Oct. 29, 2007.

* cited by examiner

*Primary Examiner* — Irina S Zemel
*Assistant Examiner* — Jeffrey Lenihan
(74) *Attorney, Agent, or Firm* — Buchanan Ingersoll & Rooney PC

(57) ABSTRACT

Rubber composition based on at least one diene elastomer, a polymer filler as reinforcing filler, a coupling agent providing the bond between the polymer filler and the elastomer. The polymer filler comprises nanoparticles of non-aromatic vinnyl polymer ("NAVP") bearing a function Z of formula $\equiv$Si—X, X representing a hydroxyl or hydrolysable group. The NAVP is in particular a copolymer of methyl methacrylate, trimethoxysilylpropyl methacrylate and ethylene glycol dimethacrylate, in the form of nanobeads the diameter of which is between 10 and 100 nm.

64 Claims, 1 Drawing Sheet

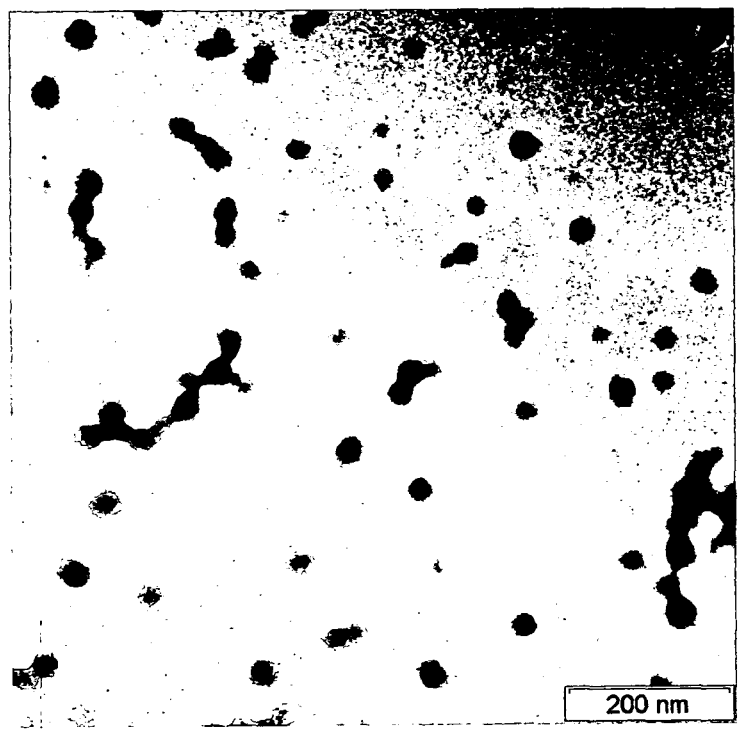

ELASTOMERIC COMPOSITION REINFORCED WITH A FUNTIONALIZED NON-AROMATIC VINYL POLYMER FILLER

BACKGROUND

The present invention relates to diene elastomer compositions usable in particular for the manufacture of tyres or semi-finished products for tyres, for example of treads for these tyres.

It also relates to reinforcing fillers capable of reinforcing such rubber compositions, more particularly to reinforcing fillers of organic or polymeric type, and also to their use for reinforcing such rubber compositions.

So as to reduce fuel consumption and the pollution emitted by motor vehicles, major attempts have been made by tyre designers to obtain tyres having all of the following: very low rolling resistance, improved adhesion both on dry ground and on wet or snow-covered ground, and good wear resistance. One effective solution to this problem has been found, over the last fifteen years, owing to the development of new rubber compositions comprising truly reinforcing fillers of inorganic type, also known as "non-black fillers", very particularly highly dispersible silicas ("HD" silicas), which have proved capable of replacing conventional carbon blacks for tyres in their reinforcing filler function.

However, these reinforcing inorganic fillers, due to having a slightly greater density for an equivalent reinforcing ability, have the known drawback of increasing the weight of the compositions and articles made of rubber derived therefrom, compared with the use of carbon black, which rather rules out another, more general, object, which is to reduce the weight of the tyres and therefore of the vehicles comprising them.

In continuing their research, the Applicants have discovered that there are certain synthetic organic fillers which can be used in these compositions as true reinforcing fillers, that is to say, are capable of replacing conventional carbon blacks for tyres just like HD silicas.

These synthetic organic fillers, due to having a density which is approximately half as much, make it possible very significantly to reduce the weight of the compositions and that of the rubber articles containing them, without compromise on the use properties of the tyres.

SUMMARY OF DISCLOSURE

Consequently, a first subject of the invention relates to a rubber composition based on at least one diene elastomer, a polymer filler, a coupling agent providing the bond between the polymer filler and the elastomer, characterised in that said polymer filler comprises nanoparticles of non-aromatic vinyl polymer (abbreviated to "NAVP") bearing a function "Z" of formula $\equiv$Si—X, X representing a hydroxyl or hydrolysable group.

The subject of the invention is also a masterbatch based on at least a diene elastomer and a polymer filler comprising nanoparticles of the Z-functionalised NAVP above.

Another subject of the invention is also a process for obtaining a masterbatch, comprising the following steps:
  starting from a latex of the diene elastomer and a latex of the polymer filler;
  mixing them thoroughly;
  precipitating the mix thus obtained;
  then washing and drying the precipitate thus obtained,
this process being characterised in that said polymer filler comprises nanoparticles of the Z-functionalised NAVP above.

The subject of the invention is also the use of a masterbatch according to the invention for the manufacture of a diene elastomer composition.

The subject of the invention is also a process for obtaining a rubber composition in which there are incorporated in at least one diene elastomer at least one polymer filler and a coupling agent providing the bond between said filler and the elastomer, and in that the entire mix is kneaded thermomechanically, in one or more steps, until a maximum temperature of between 110° C. and 190° C. is reached, this process being characterised in that said polymer filler comprises nanoparticles of the Z-functionalised NAVP. Very preferably, to facilitate their incorporation into the composition of the invention, the NAVP nanoparticles are incorporated in the composition in the form of the masterbatch of the invention.

Another subject of the invention is the use of a composition according to the invention for the manufacture of finished articles or semi-finished products made of rubber, and also these finished articles and semi-finished products themselves, comprising a rubber composition according to the invention, these articles or products being intended in particular for any ground contact system for automobiles, such as tyres, internal safety supports for tyres, wheels, rubber springs, elastomeric joints and other suspension and anti-vibration elements.

A very particular subject of the invention is the use of a rubber composition according to the invention for the manufacture of tyres or semi-finished products for tyres, selected in particular from the group consisting of treads, underlayers intended for example to be positioned beneath these treads, crown reinforcement plies, sidewalls, carcass reinforcement plies, beads, protectors, inner tubes, airtight internal rubbers for tubeless tyres, internal sidewall reinforcement rubbers and other rubbers intended for bearing the load in the event of travelling on a flat tyre.

The composition according to the invention is particularly suited to the manufacture of tyres intended to be fitted on passenger vehicles, vans, 4×4 vehicles (having 4 driving wheels), SUVs ("Sport Utility Vehicles"), two-wheeled vehicles, "heavy vehicles" (that is to say subway trains, buses, road transport machinery (lorries, tractors, trailers), off-road vehicles), aircraft, and construction, agricultural or handling machinery.

The invention and its advantages will be readily understood in the light of the description and the examples of embodiment which follow, and also from the figure, which is an electron microscopy (TEM) image taken of a sample of NAVP nanoparticles in aqueous emulsion, in accordance with the invention (FIG. 1).

Measurements and Testes Used

1. Characterisation of the Polyvinyl Filler

The NAVP filler described below consists of "nanoparticles", that is to say particles the principal dimension of which (diameter or length) is typically less than one micrometre, generally within a range of the order of about ten nanometres to one or several hundreds of nanometres.

These NAVP nanoparticles are in the form of elementary particles (or "primary particles"), these elementary particles or nanoparticles possibly forming aggregates (or "secondary particles") of at least two of these nanoparticles, said nanoparticles and/or aggregates possibly in turn forming agglomerates capable of disagglomerating into these nanoparticles and/or aggregates under the effect of an external force, for example under the action of mechanical working.

These nanoparticles are characterised using a transmission electron microscope (TEM), as indicated below.

A) Characterisation in an Emulsion (Latex)

The NAVP filler latex, diluted beforehand with water (for example 8 g of filler per liter of water) is diluted to approximately 50 times its volume in isopropanol. 40 ml of the solution thus obtained is poured into a tall-form beaker (50 ml), then dispersed using a 600 W ultrasound probe (Vibracell probe, reference 72412, sold by Bioblock Scientific), at a power of 100%, for 8 min. in pulse mode (1 sec ON/1 sec OFF). A drop of the solution thus obtained is then placed on a copper microscope grid with a carbon membrane, then observed under a TEM ("CM 200" sold by FEI, acceleration voltage 200 kV) equipped with a camera (MegaView II camera sold by Soft Imaging System) and an image analysis system (AnalySIS Pro A version 3.0 from Soft Imaging System).

The settings of the TEM are optimised in known manner, according to the sample and the state of ageing of the filament (typically, condenser diaphragm 2 (50 μm diameter)–lens 3 (40 μm diameter)). The magnification of the microscope is adapted so as to have sufficient resolution on the nanoparticles. For example, a magnification of 65,000 corresponds to a resolution close to 0.96 nm/pixel, on a digital image of 1248×1024 pixels; such a resolution permits, for example, definition of a spherical nanoparticle of 40 nm diameter with more than 1000 pixels. The camera is calibrated conventionally using standards (at low magnification, a gold grid of 2160 lines/mm; at high magnification, gold beads of a diameter of 0.235 nm).

The diameter of the nanoparticles is measured using the software AnalySIS Pro A version 3.0 (with "Circle" option of the "Measurement" menu). For each image and for a given nanoparticle, the operator shows on the screen (using the mouse) three points located on the periphery of the image of the nanoparticle. The software then automatically traces the circle passing through these three points and stores the values of the circular area, the circular perimeter and the circular diameter of the nanoparticle in a file (Excel). As this operation is possible only for nanoparticles having well-defined contours, nanoparticles present in agglomerates are excluded from the measurement. The test is repeated on at least 2000 nanoparticles representative of the sample (from at least 10 different images, typically 50).

B) Characterisation in a Rubber Composition

The samples of NAVP filler in vulcanised rubber composition are prepared in known manner by ultracryomicrotomy (see for example L. Sawyer and D. Grubb, *Polymer Microscopy*, p. 92, Chapman and Hall).

The apparatus used here is a Leica ultracryomicrotome ("EMFCS") equipped with a diamond knife. The sample is cut in the form of a truncated pyramid with rectangular base, the truncated face from which the sections will be taken having a side length of less than 600 μm. This truncated pyramid is held firmly during cutting. The sample is cooled to a suitable temperature (close to the glass transition temperature of the sample) so that it is sufficiently hard to permit cutting, the temperature of the knife being typically close to that of the sample. The speed and thickness of cut (as displayed by the equipment) are preferably between 1 and 2 mm/sec and between 20 and 30 nm, respectively. Using a drop of aqueous sucrose solution (40 g in 40 ml of water), the sections are recovered from the enclosure of the ultracryomicrotome, then placed on a TEM grid, at ambient temperature. The sucrose is then eliminated by placing the grid on the surface of a crystalliser filled with distilled water.

To increase the contrast, the sections may be subjected to a step of staining with osmium tetroxide ($OsO_4$), using a process well-known to the person skilled in the art (L. C. Sawyer and David Grubb, Polymer Microscopy, Chapman and Hall, London, New York, 1987, pp. 97-98): the grids are placed above an open crystalliser containing a mix of 20 ml distilled water and 0.1 g of $OsO_4$ (Agar Scientific, reference R1015); the whole, placed in an airtight desiccator, is heated in a water bath to 50° C. for 3 to 3½ hours.

The sections are observed using a CM 200 microscope (voltage 200 kV). To optimise the contrast, the observations are performed by conventional energy-filtered imaging (energy window ΔE equal to approximately 15 eV), with a GIF (Gatan Imaging Filter) imaging system and the associated software (Filter Control and Digital Micrograph 3.4).

2. Characterisation of the Rubber Compositions

The rubber compositions are characterised, before and after curing, as indicated below.

A) Tensile Tests

These tests make it possible to determine the elasticity stresses and the properties at break after curing. Unless indicated otherwise, they are effected in accordance with French Standard NF T 46-002 of September 1988. The true secant moduli (i.e. calculated reduced to the real section of the test piece), expressed in MPa, at 100% elongation (moduli marked M100), 300% elongation (M300) and 400% elongation (M400), are measured in a first elongation (i.e. without an accommodation cycle). All these tensile measurements are effected under normal conditions of temperature and humidity (23±2° C.; 50±5% relative humidity).

B) Rheometry

The measurements are effected at 150° C. with an oscillating-chamber rheometer, in accordance with DIN Standard 53529—part 3 (June 1983). The evolution of the rheometric torque as a function of time describes the evolution of the stiffening of the composition following the vulcanisation reaction. The measurements are processed in accordance with DIN Standard 53529—part 2 (March 1983). The conversion rate constant K (in $min^{-1}$) of order 1, calculated between 30% and 80% conversion, is measured, which makes it possible to assess the vulcanisation kinetics (the higher K is, the faster are the kinetics).

C) Dynamic Properties

The dynamic properties $\Delta G^*$ and $\tan(\delta)_{max}$ are measured on a viscoanalyser (Metravib VA4000), in accordance with ASTM Standard D 5992-96. The response of a sample of vulcanised composition (cylindrical test piece of a thickness of 2 mm and a section of 79 $mm^2$), subjected to an alternating single sinusoidal shearing stress, at a frequency of 10 Hz, under normal conditions of temperature (23° C.) in accordance with Standard ASTM D 1349-99, is recorded. Scanning is effected at an amplitude of peak-to-peak deformation of 0.1 to 50% (outward cycle), then of 50% to 0.1% (return cycle). The results used are the complex dynamic shear modulus ($G^*$) and the loss factor tan δ. For the return cycle, the maximum value of tan δ which is observed is indicated ($\tan(\delta)_{max}$), as is the deviation in the complex modulus ($\Delta G^*$) between the values at 0.1 and 50% deformation (Payne effect).

DETAILED DESCRIPTION OF PREFERRED EMBODIMENTS OF THE INVENTION

The rubber compositions according to the invention are based on at least the following constituents: a (that is to say at least one) diene elastomer, a (at least one) polymer filler as reinforcing filler and a (at least one) coupling agent providing the bond between this polymer filler and this diene elastomer, said polymer filler comprising NAVP nanoparticles such as described in detail below.

Of course, the expression "based on" is to be understood to mean a composition comprising the mix and/or the product of reaction of the different base constituents used, some of these constituents being able to react and/or being intended to react together, at least in part, during the different phases of manufacture of the composition, or during the later curing thereof. This definition also applies to the masterbatch of the invention.

In the present description, unless expressly indicated otherwise, all the percentages (%) indicated are mass %.

1. Diene Elastomer

Elastomer or rubber (the two terms being synonymous) of "diene" type is generally understood to mean an elastomer resulting at least in part (i.e. a homopolymer or a copolymer) from diene monomers (monomers bearing two double carbon-carbon bonds, whether conjugated or not).

These diene elastomers may be placed in two categories: "essentially unsaturated" or "essentially saturated". "Essentially unsaturated" is understood to mean a diene elastomer resulting at least in part from conjugated diene monomers, having a content of members or units of diene origin (conjugated dienes) which is greater than 15% (mole percent); thus diene elastomers such as butyl rubbers or copolymers of dienes and of alpha-olefins of the EPDM type do not fall within the preceding definition, and may in particular be described as "essentially saturated" diene elastomers (low or very low content of units of diene origin which is always less than 15%). Within the category of "essentially unsaturated" diene elastomers, "highly unsaturated" diene elastomer is understood to mean in particular a diene elastomer having a content of units of diene origin (conjugated dienes) which is greater than 50%.

These definitions being given, the following are understood more particularly to be meant by diene elastomer capable of being used in the compositions according to the invention:
(a) any homopolymer obtained by polymerisation of a conjugated diene monomer having 4 to 12 carbon atoms;
(b) any copolymer obtained by copolymerisation of one or more dienes conjugated together or with one or more vinyl aromatic compounds having 8 to 20 carbon atoms;
(c) a ternary copolymer obtained by copolymerisation of ethylene, of an α-olefin having 3 to 6 carbon atoms with a non-conjugated diene monomer having 6 to 12 carbon atoms, such as, for example, the elastomers obtained from ethylene, from propylene with a non-conjugated diene monomer of the aforementioned type, such as in particular 1,4-hexadiene, ethylidene norbornene or dicyclopentadiene;
(d) a copolymer of isobutene and isoprene (butyl rubber), and also the halogenated, in particular chlorinated or brominated, versions of this type of copolymer.

Although it applies to any type of diene elastomer, the person skilled in the art of tyres will understand that the present invention is preferably used with essentially unsaturated diene elastomers, in particular those of type (a) or (b) above.

Suitable conjugated dienes are, in particular, 1,3-butadiene, 2-methyl-1,3-butadiene, 2,3-di($C_1$-$C_5$ alkyl)-1,3-butadienes such as, for example, 2,3-dimethyl-1,3-butadiene, 2,3-diethyl-1,3-butadiene, 2-methyl-3-ethyl-1,3-butadiene, 2-methyl-3-isopropyl-1,3-butadiene, an aryl-1,3-butadiene, 1,3-pentadiene and 2,4-hexadiene. Suitable vinyl aromatic compounds are, for example, styrene, ortho-, meta- and para-methylstyrene, the commercial mix "vinyltoluene", para-tert. butylstyrene, methoxystyrenes, chlorostyrenes, vinylmesitylene, divinylbenzene and vinylnaphthalene.

The copolymers may contain between 99% and 20% by weight of diene units and between 1% and 80% by weight of vinyl aromatic units. The elastomers may have any microstructure, which is a function of the polymerisation conditions used, in particular of the presence or absence of a modifying and/or randomising agent and the quantities of modifying. and/or randomising agent used. The elastomers may for example be block, random, sequential or microsequential elastomers, and may be prepared in a dispersion (in particular emulsion) or in solution; they may be coupled and/or starred or alternatively functionalised with a coupling and/or starring or functionalising agent.

Polybutadienes are suitable, and in particular those having a content of 1,2-units of between 4% and 80%, or those having a cis-1,4 content of more than 80%, polyisoprenes, butadiene/styrene copolymers and in particular those having a styrene content of between 5% and 50% by weight and more particularly between 20% and 40%, a content of 1,2-bonds of the butadiene fraction of between 4% and 65%, a content of trans-1,4 bonds of between 20% and 80%, butadiene/isoprene copolymers and in particular those having an isoprene content of between 5% and 90% by weight and a glass transition temperature (Tg, measured in accordance with ASTM D3418) of −40° C. to −80° C., isoprene/styrene copolymers and in particular those having a styrene content of between 5% and 50% by weight and a Tg of between −25° C. and −50° C. In the case of butadiene/styrene/isoprene copolymers, those which are suitable are in particular those having a styrene content of between 5% and 50% by weight and more particularly between 10% and 40%, an isoprene content of between 15% and 60% by weight, and more particularly between 20% and 50%, a butadiene content of between 5% and 50% by weight and more particularly between 20% and 40%, a content of 1,2-units of the butadiene fraction of between 4% and 85%, a content of trans-1,4 units of the butadiene fraction of between 6% and 80%, a content of 1,2-plus 3,4-units of the isoprene fraction of between 5% and 70%, and a content of trans-1,4 units of the isoprene fraction of between 10% and 50%, and more generally any butadiene/styrene/isoprene copolymer having a Tg of between −20° C. and −70° C.

In summary, the diene elastomer of the composition according to the invention is preferably selected from the group of highly unsaturated diene elastomers which consists of polybutadienes (abbreviated to "BR"), polyisoprenes (IR), natural rubber (NR), butadiene copolymers, isoprene copolymers and mixs of these elastomers. Such copolymers are more preferably selected from the group consisting of butadiene/acrylonitrile copolymers (ABR), butadiene/styrene copolymers (SBR), isoprenetbutadiene copolymers (BIR), isoprene/styrene copolymers (SIR) and isoprenelbutadiene/styrene copolymers (SBIR).

According to one particular embodiment, the diene elastomer is majoritarily (that is to say to more than 50 phr) an SBR, be it an SBR prepared in emulsion ("E-SBR") or an SBR prepared in solution ("S-SBR"), or an SBR/BR, SBR/NR (or SBR/IR), or alternatively BR/NR (or BR/IR) blend (mix).

According to another particular embodiment, the diene elastomer is majoritarily (to more than 50 phr) an isoprene elastomer. This is the case in particular when the compositions of the invention are intended to constitute, in tyres, the rubber matrices of certain treads (for example for industrial vehicles), crown reinforcement plies (for example of working plies, protective plies or wrapping plies), carcass reinforcement plies, sidewalls, beads, protectors, underlayers, blocks of rubber and other internal rubbers providing the interface between the aforementioned zones of the tyres.

"Isoprene elastomer" is understood to mean, in known manner, an isoprene homopolymer or copolymer, in other words a diene elastomer selected from the group consisting of natural rubber (NR), synthetic polyisoprenes (IR), the various isoprene copolymers and mixs of these elastomers. Of the isoprene copolymers, mention will be made in particular of isobutene/isoprene copolymers (butyl rubber—IIR), isoprene/styrene copolymers (SIR), isoprene/butadiene copolymers (BIR) or isoprene/butadiene/styrene copolymers (SBIR). This isoprene elastomer is preferably natural rubber or a synthetic cis-1,4 polyisoprene; of these synthetic polyisoprenes, preferably polyisoprenes having a content (mole %) of cis-1,4 bonds greater than 90%, more preferably still greater than 98%, are used.

According to another particular embodiment, in particular when it is intended for a tyre sidewall, or for an airtight internal rubber of a tubeless tyre (or other element impermeable to air), the composition according to the invention may contain at least one essentially saturated diene elastomer, in particular at least one EPDM copolymer or a butyl rubber (possibly chlorinated or brominated), whether these copolymers be used alone or in a mix with highly unsaturated diene elastomers such as mentioned previously, in particular NR or IR, BR or SBR.

The compositions of the invention may contain a single diene elastomer or a mix of several diene elastomers, the diene elastomer(s) possibly being used in association with any type of synthetic elastomer other than a diene elastomer, or even with polymers other than elastomers, for example thermoplastic polymers.

2. NAVP Polymer Filler

The reinforcing polymeric filler of the compositions of the invention has the essential characteristic of comprising nanoparticles of a functionalised non-aromatic vinyl polymer (NAVP), bearing a (at least one) function "Z" of Formula (I):

in which Si represents a silicon atom and X represents a hydroxyl group or a hydrolysable monovalent group.

The person skilled in the art will readily understand from reading this Formula (I) that there is at least one and at most three X or hydroxyl group(s) or hydrolysable monovalent group(s), joined to the NAVP via the tetravalent silicon atom.

In the present application, the following are understood to mean by definition:
"vinyl monomer", any monomer bearing at least one vinyl group ($CH_2$=CH—) or (substituted form) vinylidene group ($CH_2$=C<);
"non-aromatic vinyl monomer", any vinyl monomer other than a monomer of vinyl aromatic type, that is to say alpha-substituted by an aromatic group;
"non-aromatic vinyl polymer" ("NAVP"), any homopolymer of non-aromatic vinyl monomer or any copolymer at least the majority weight fraction of which (preferably at least equal to or greater than 50%, more preferably equal to or greater than 70%) comprises non-aromatic vinyl units, the minority fraction (preferably less than 50%, more preferably less than 30%) possibly resulting from monomer(s) of a different nature, including vinyl aromatic monomers.

Preferably, in Formula (I) above, X is a halogen, in particular chlorine, or X satisfies the formula OR in which O is oxygen and R represents hydrogen or a straight-chain or branched monovalent hydrocarbon group, comprising preferably from 1 to 15 carbon atoms.

Z functions selected from the so-called "hydroxysilyl" (≡Si—OH) or "alkoxysilyl" (≡Si—OR') functions are more particularly suitable, R' being a hydrocarbon radical preferably comprising from 1 to 15 carbon atoms, more preferably selected from among alkyls, alkoxyalkyls, cycloalkyls and aryls, in particular from among $C_1$-$C_8$ alkyls, $C_2$-$C_8$ alkoxyalkyls, $C_5$-$C_{10}$ cycloalkyls and $C_6$-$C_{12}$ aryls.

According to one particular preferred embodiment of the invention, Z corresponds to one of the formulae below:

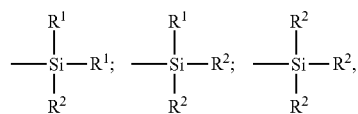

in which:
the radicals $R^1$, which may or may not be substituted, and may be identical or different, are selected from the group consisting of $C_1$-$C_8$ alkyls, $C_5$-$C_8$ cycloalkyls and $C_6$-$C_{12}$ aryls;
the radicals $R^2$, which may or may not be substituted, and may be identical or different, are selected from the group consisting of hydroxyl, $C_1$-$C_8$ alkoxyls and $C_5$-$C_8$ cycloalkoxyls.

More preferably, in these relationships:
the radicals $R^1$ are selected from the group consisting of $C_1$-$C_4$ alkyls, cyclohexyl and phenyl, in particular from among $C_1$-$C_4$ alkyls, more particularly from among methyl and ethyl;
the radicals $R^2$ are selected from the group consisting of hydroxyl and $C_1$-$C_6$ alkoxyls, in particular from among hydroxyl and $C_1$-$C_4$ alkoxyls, more particularly from among hydroxyl, methoxyl and ethoxyl.

More preferably still, the radicals $R^1$ are selected from among methyl and ethyl and the radicals $R^2$ are selected from among hydroxyl, methoxyl and ethoxyl.

The Z-functionalisation previously described of the NAVP could be carried out on the final polymer, for example by reaction on its residual double bonds. It is preferred to supply it using a Z-functionalised comonomer (referred to below as comonomer B).

In other words, according to one particular embodiment of the invention, said NAVP is a copolymer of at least the following two monomers:
a first, non-aromatic, vinyl monomer ("A");
a second monomer ("B") bearing the Z function of Formula (I) previously defined.

The non-aromatic vinyl monomer A above preferably corresponds to Formula (1I):

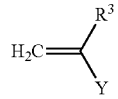

in which:
the radical $R^3$ is selected from the group consisting of hydrogen, $C_1$-$C_8$ alkyls and $C_5$-$C_8$ cycloalkyls;
the radical Y is selected from the group consisting of halogens, the radicals OH, OR', SR', C≡N, C(O)OH, C(O)OR', C(O)N(R'R"), C(O)R' and OC(O)R' in which R' and R", which may be identical or different, are selected from the group consisting of linear, branched or cyclic alkyls, comprising from 1 to 12 carbon atoms, and aryls, aralkyls or alkaryls comprising from 6 to 20 carbon atoms, R' and R" possibly comprising at least one heteroatom selected from among halogens (preferably chlorine), oxygen, nitrogen and sulphur.

The following monomers may be mentioned by way of examples of such monomers A:

vinyl alcohol (for the hydroxyl radical Y=OH);

methyl vinyl ether, ethyl vinyl ether, phenyl vinyl ether (for the organoxyl radical Y=OR");

methyl vinyl thioether, ethyl vinyl thioether, phenyl vinyl thioether (for the sulphenyl radical Y=SR');

acrylonitrile and methacrylonitrile (for the cyano radical Y=C≡N);

acrylic acid and methacrylic acid (for the carboxyl radical Y=C(O)OH);

methyl, n-butyl, tert. butyl, hydroxyethyl, glycidyl (meth)acrylates (for the oxycarbonyl radical Y=C(O)OR=);

N,N-dimethyl-(meth)acrylamide, N,N-diisopropyl-(meth)acrylamide, N-methyl-N-isopropylacrylamide (for the carbamoyl radical Y=C(O)N(R'R"));

vinyl methyl ketone (for the acyl radical Y=C(O)R');

vinyl acetate, vinyl propanoate (for the acyloxy radical Y=OC(O)R').

Preferably, in Formula (II) above, the following characteristics are satisfied:

$R^3$ is selected from the group consisting of hydrogen and $C_1$-$C_6$ alkyls;

Y is selected from the group consisting of chlorine, the radicals C(O)OH, C(O)OR', C(O)N(R'R") and OC(O)R'.

More preferably still, the following characteristics are satisfied:

Y is the group C(O)OR';

$R^3$ is hydrogen or methyl.

By way of examples of monomers A which satisfy the more preferable characteristics above, mention will be made particularly of the acrylate or methacrylate monomers of Formula (II) in which Y is C(O)OR' and R' is selected from the group consisting of alkyls having from 1 to 8 carbon atoms.

By way of examples of monomers A which satisfy the preferred characteristics above, mention will be made particularly of acrylate ($R^3$=hydrogen) or methacrylate ($R^3$=methyl) monomers in which R' is an alkyl comprising from 1 to 4 carbon atoms, in particular those selected from the group consisting of methyl acrylate (R' is methyl), methyl methacrylate (R' is methyl), ethyl acrylate (R' is ethyl), ethyl methacrylate (R' is ethyl), n-butyl acrylate (R' is n-butyl), n-butyl methacrylate (R' is n-butyl), tert. butyl acrylate (R' is tert. butyl), tert. butyl methacrylate (R' is tert. butyl), hydroxyethyl acrylate (R' is hydroxyethyl), hydroxyethyl methacrylate (R' is hydroxyethyl), and mixs of these compounds.

For clarity of the explanation, the structural formulae of some of these preferred monomers A of monofunctional type are recalled below:

methyl acrylate

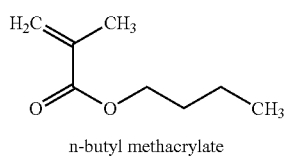
n-butyl methacrylate

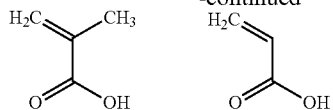
methacrylic acid    acrylic acid

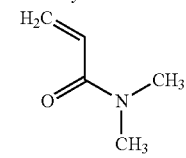
N,N-dimethylacrylamide

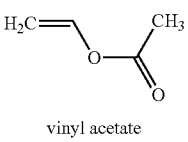
vinyl acetate

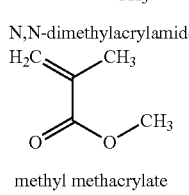
methyl methacrylate

Preferably methyl acrylate or methyl methacrylate, more preferably still methyl methacrylate (abbreviated to "MMA"), is used.

By way of examples of monomers A of bifunctional type, there could be used diene monomers of Formula (II) above in which the radical Y bears a second vinyl or vinylidene group which is copolymerisable by free-radical polymerisation.

According to a first preferential embodiment, the monomer B is chosen from the group constituted by hydroxysilyl($C_1$-$C_4$)alkyl acrylates, hydroxysilyl($C_1$-$C_4$)alkyl methacrylates, ($C_1$-$C_4$)alkoxysilyl($C_1$-$C_4$)alkyl acrylates, ($C_1$-$C_4$)alkoxysilyl($C_1$-$C_4$)alkyl methacrylates, and mixtures of these compounds. More preferentially, the monomer B is chosen from the group constituted by hydroxysilyl($C_1$-$C_4$)alkyl acrylates, hydroxysilyl($C_1$-$C_4$)alkyl methacrylates, methoxysilyl($C_1$-$C_4$)alkyl acrylates, methoxysilyl($C_1$-$C_4$)alkyl methacrylates, ethoxysilyl($C_1$-$C_4$)alkyl acrylates and ethoxysilyl($C_1$-$C_4$)alkyl methacrylates, and mixes of these compounds.

More particularly, the monomer B is chosen from the group constituted by hydroxysilylpropyl acrylates, hydroxysilylpropyl methacrylates, methoxysilylpropyl acrylates, methoxysilylpropyl methacrylates, ethoxysilylpropyl acrylates and ethoxysilylpropyl methacrylates, and mixes of these compounds. Even more particularly, the comonomer B is trimethoxysilylpropyl acrylate or trimethoxysilylpropyl methacrylate.

According to another preferential embodiment, the comonomer B is chosen from the group constituted by styryl ($C_1$-$C_4$)alkylhydroxysilanes and styryl($C_1$-$C_4$)alkyl($C_1$-$C_4$) alkoxysilanes, and mixes of these compounds. More preferentially, this comonomer B is chosen from the group constituted by styryl($C_1$-$C_4$)alkylhydroxysilanes, styryl($C_1$-$C_4$)alkylmethoxysilanes and styryl($C_1$-$C_4$)alkylethoxysilanes, and mixes of these compounds.

More particularly, the comonomer B is chosen from the group constituted by styrylethylhydroxysilanes, styrylethylmethoxysilanes and styrylethylethoxysilanes, and mixes of these compounds. Even more particularly, the comonomer B is styrylethyltrimethoxysilane.

Preferably, the molar content of comonomer B in the non-aromatic vinyl polymer is greater than 5%, more preferentially between 5% and 30% and in particular between 5% and 20%.

Moreover, in the composition of the invention, the weight content of monomer B is preferably between 10% and 30% and more preferentially between 20% and 30%.

According to another particularly preferred embodiment of the invention, the functionalised NAVP is furthermore present in a cross-linked state, that is to say in a three-dimensional form, so as maintain the morphology of the filler properly at high temperature.

Such cross-linking could be provided by any known means, for example using post-treatment or, according to a more preferable embodiment, by at least one of the starting comonomers, provided, of course, that the latter is at least bifunctional, that is to say bears at least one second function capable of creating a three-dimensional NAVP network upon polymerisation. This cross-linking may advantageously be supplied by the presence of a third comonomer (referred to as comonomer C below).

In other words, in such a specific case, the NAVP is a copolymer of at least the following three monomers, all three preferably being copolymerisable by free radical polymerisation:

a first, non-aromatic, vinyl comonomer ("A");

a second comonomer ("B") bearing the Z function of Formula (I);

a third, cross-linking, comonomer ("C"), that is to say one which is at least bifunctional from the point of view of said polymerisation.

This monomer C, termed "cross-linking", may be a vinyl or non-vinyl, aromatic or aliphatic monomer.

More preferably suitable as comonomer C are comonomers bearing two unsaturated groups, in particular ethylene groups, polymerisable by free-radical polymerisation, in particular those selected from the group consisting of di(meth)acrylates or tri(meth)acrylates of polyols, in particular of diols or of triols (for example of ethylene glycol, propylene glycol, 1,4-butanediol, 1,6-hexanediol, trimethylolpropane), alkylene di(meth)acrylamides (for example methylene bisacrylamide), vinyl aromatic compounds, preferably styrene ones, bearing at least two vinyl groups (for example diisopropenylbenzene (DIB), divinylbenzene (DVB), trivinylbenzene (TVB)), and mixs of such comonomers.

The structural formulae of some of these examples of preferred monomers C will be recalled below:

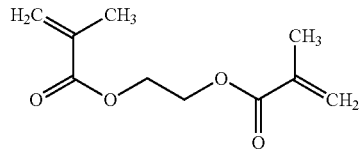

Ethylene glycol dimethacrylate (abbreviated to "EGDMA")

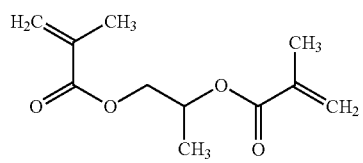

Propylene glycol dimethacrylate (abbreviated to "PGDMA")

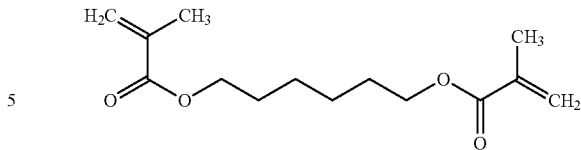

Hexamethylene glycol dimethacrylate (abbreviated to "HGDMA")

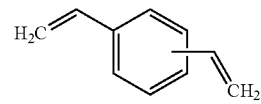

Divinylbenzene (abbreviated to "DVB")

According to one particularly preferred embodiment, the NAVP used is a polyacrylate or polymethacrylate, or a copolymer resulting from (meth)acrylate units in a majority weight fraction (preferably at least equal to or greater than 50%, more preferably equal to or greater than 70%), for example a copolymer selected from the group consisting of the copolymers MMA-TSPM-EGDMA, MMA-TSPM-PGDMA, MMA-TSPM-HGDMA and MMA-TSPM-DVB.

The comonomer B bearing the aforementioned function Z or the comonomer A could be also used as cross-linking comonomer, provided of course that this comonomer B or this comonomer A is itself at least bifunctional and copolymerisable by free-radical polymerisation with the other comonomers.

The weight ratio of cross-linking comonomer C is preferably greater than 1%, more preferably greater than 5%, in particular between 10 and 30%.

Various other monomers, such as for example diene monomers such as butadiene, isoprene, piperylene, may possibly be added in a minority proportion, preferably less than 20% of the total weight of monomers.

According to one particularly preferred embodiment of the invention, the monomers A, B and C are different and are all three vinyl monomers, in particular are all three non-aromatic vinyl monomers.

According to another particularly preferred embodiment of the invention, whether combined or not with the previous one, the monomers A and B bear a single function polymerisable by addition, and the cross-linking monomer C bears only two functions which are polymerisable by free-radical polymerisation.

The cross-linked, Z-functionalised NAVP may be prepared by any synthesis process suitable for functionalisation of a vinyl copolymer.

Preferably, this synthesis is carried out by free-radical polymerisation of the different monomers. The general principle of such a technique is known, and has been applied in particular to the free-radical polymerisation in emulsion of Z-functionalised polystyrene (alkoxysilane or hydroxysilane) in the presence of TSPM (see for example *Macromolecules* 2001, 34, 5737 and *Macromolecules* 2002, 35, 6185), or to the synthesis of polystyrene which is cross-linked (but not functionalised) in the presence of DVB (*Polymer* 2000, 41, 481).

Preferably, for the synthesis described above, the non-aromatic vinyl monomer A is an acrylate or methacrylate monomer; the functionalising comonomer B (bearing the function Z) is preferably selected from the group consisting of TSPM, TSPA, TSES and mixs of these monomers; the cross-linking comonomer C is itself a vinyl compound, preferably selected from the group consisting of HGDMA, PGDMA, EGDMA, DVB and mixs of these monomers.

There may thus be obtained nanoparticles of Z-functionalised, cross-linked NAVP, in emulsion in water, that is to say in the form of a latex (typically, for example, 100 g of polymer per liter of water). It will be recalled that polymer "latex" must be understood in known manner to mean a colloid system composed of a suspension or an emulsion of polymer particles in an aqueous medium.

As shown in FIG. 1, these NAVP nanoparticles characterised by TEM in accordance with section I-1-A above are preferably present in a substantially spherical form (therefore in the form of nanobeads), either in the isolated state or in the form of aggregates which themselves may possibly be agglomerated. The number of nanoparticles per aggregate is typically between 2 and 100.

The average diameter of these nanobeads, which can be measured for example by TEM as indicated in section I-1-A, is preferably between 10 and 100 nm, more preferably between 10 and 60 nm, in particular between 10 and 40 nm.

In the rubber composition of the invention, the amount of NAVP filler is preferably of between 10 and 100 phr (reminder: phr=parts by weight per hundred parts of elastomer). Owing to the low density of the latter, this amount is advantageously between 10 and 80 phr, preferably between 20 and 50 phr and even more preferably strictly greater than 30 phr.

Preferably, the NAVP filler furthermore constitutes more than 80%, more preferably more than 90% (% by volume) of the entire reinforcing filler, a minority fraction (preferably less than 20%, more preferably less than 10% by volume) of this entire filler possibly being constituted by another reinforcing filler, for example a reinforcing inorganic filler or carbon black. The NAVP filler may advantageously constitute the entire reinforcing filler.

"Reinforcing inorganic filler" is understood here to mean an inorganic or mineral filler, whatever its colour and its origin (natural or synthetic), also referred to as "white" filler, "clear" filler or alternatively "non-black" filler, in contrast to carbon black, this inorganic filler being capable, on its own, without any other means than an intermediate coupling agent, of reinforcing a rubber composition intended for the manufacture of tyres, in other words which is capable of replacing a conventional tyre-grade carbon black in its reinforcement function.

Suitable reinforcing inorganic fillers capable of being used in addition to the NAVP filler are in particular mineral fillers of siliceous type, in particular silica ($SiO_2$), or of aluminous type, in particular alumina ($Al_2O_3$). The silica used may be any reinforcing silica known to the person skilled in the art, in particular any precipitated or fumed silica having a BET surface area and a CTAB specific surface area both of which are less than 450 $m^2/g$, preferably from 30 to 400 $m^2/g$. As highly dispersible precipitated silicas (HD silicas), mention will be made for example of the silicas Ultrasil 7000 and Ultrasil 7005 from Degussa, the silicas Zeosil 1165MP, 1135MP and 1115MP from Rhodia, the silica Hi-Sil EZ150G from PPG, and the silicas Zeopol 8715, 8745 and 8755 from Huber, silicas such as described in application WO 03/016387. Examples of reinforcing aluminas are the aluminas "Baikalox" "A125" or "CR125" from Bafkowski, "APA-100RDX" from Condea, "Aluminoxid C" from Degussa or "AKP-G015" from Sumitomo Chemicals.

With the NAVP filler there may be also associated a carbon black, for example a black of type HAF, ISAF, SAF, conventionally used in tyres (for example highly reinforcing blacks N115, N134, N234, N326, N330, N339, N347, N375, or alternatively, depending on the intended applications, blacks of higher series, for example N660, N683, N772).

The quantity of carbon black present in the total reinforcing filler may vary within wide limits, but it is preferably less than that of the NAVP filler. Advantageously, carbon black may be used in a small or very small proportion, in a preferred amount of less than 10 phr, more preferably less than 6 phr, for example between 0 and 3 phr. Within the ranges indicated, there is a benefit to be had in particular from the colouring properties (black pigmentation agent) and anti-UV properties of the carbon blacks, without furthermore adversely affecting the typical performance provided by the NAVP polymer filler.

Preferably, the amount of total reinforcing filler in the compositions of the invention lies within a range from 20 to 400 phr, more preferably from 30 to 200 phr.

3. Masterbatch of NAVP Filler

According to the best-known embodiment of the invention, the NAVP nanoparticles previously described are incorporated in the rubber composition of the invention by means of a masterbatch, that is to say that these particles are mixed beforehand with at least one diene elastomer in order to facilitate their later incorporation into the final rubber composition.

"Masterbatch" should be understood in known manner to mean the mix of at least one elastomer (more generally, a polymer) and a reinforcing filler, the precursor mix of the final elastomer (or polymer) composition, ready for use.

This masterbatch, which comprises at least the NAVP filler functionalised as described previously and a diene elastomer (or mix of diene elastomers), constitutes another subject of the present invention.

This masterbatch is capable of being prepared by a process which itself is a subject of the invention, comprising the following steps:

starting from a latex of diene elastomer and a latex of functionalised NAVP;
mixing them thoroughly;
precipitating the mix thus obtained;
then washing and drying the precipitate thus obtained.

The diene elastomer latex may consist of an elastomer already available in emulsion (for example an emulsion SBR), or a diene elastomer initially in solution (for example a solution SBR) which is emulsified in a mix of organic solvent and water, generally by means of a surfactant (the organic solvent being eliminated at the moment of coagulation or precipitation).

The operation of thoroughly mixing the two latexes is performed so as to disperse the polymer filler properly in the diene elastomer, homogenise the entire mix to form a latex mix of concentration of solid matter preferably of between 20 and 500 g/l, more preferably between 50 and 350 g/l. Preferably, the two starting latexes are diluted in water before mixing (for example 1 volume of water to 1 volume of latex).

The mix of the two latexes may be precipitated by any process known to the person skilled in the art, for example by mechanical action or preferably by action of a coagulating agent.

The coagulating agent is any liquid compound, water-miscible but a non-solvent (or poor solvent) of the elastomer, for example an aqueous saline solution, preferably an alcohol or a mix of solvents comprising at least one alcohol (for example alcohol and water, alcohol and toluene). More preferably, the coagulating agent is a single alcohol such as methanol or isopropanol. The coagulation is carried out preferably with stirring, at ambient temperature, in a large volume of coagulating agent; typically, a volume of alcohol at least twice the total combined volume of the two diluted latexes is used. During this step, it is preferred to pour the mix of the two latexes on to the coagulating agent, and not vice versa.

After washing and drying, the masterbatch is obtained in the form of rubber "crumbs", comprising at least the selected diene elastomer (for example NR or SBR) and the NAVP nanoparticles embedded in the elastomer matrix.

Various additives may possibly be incorporated in the masterbatch, whether they be intended for the masterbatch proper (for example a stabilising agent, carbon black as colouring and anti-UV agent, a plasticiser, an antioxidant, etc.) or in the final rubber composition (for example a coupling agent) for which the masterbatch is intended.

The elastomer of the masterbatch may be any diene elastomer, whether identical or not to the one (or ones) of the rubber matrix of the invention. It may be advantageous to use the same diene elastomer and to adjust the amount of NAVP in the masterbatch to the intended final amount for the composition, so as not to have to add diene elastomer later, during the manufacture of the composition of the invention.

4. Coupling Agent

Like any reinforcing inorganic filler such as silica, the Z-functionalised NAVP filler requires using a coupling agent (also referred to as bonding agent) to establish a sufficient connection between the surface of its particles and the diene elastomer, and fully to perform its function of reinforcing filler in the compositions of the invention.

It will be recalled that a coupling agent, which is at least bifunctional, has in particular the simplified general formula "$U_1$-T-$U_2$", in which:

$U_1$ represents a functional group ("$U_1$" function) which is capable of bonding physically and/or chemically to the filler;

$U_2$ represents a functional group ("$U_2$" function) which is capable of bonding physically and/or chemically with the diene elastomer, for example by means of a sulphur atom;

T represents a divalent group making it possible to link $U_1$ and $U_2$.

(Silica/diene elastomer) coupling agents, of variable effectiveness, have been described in a very large number of documents and are well-known to the person skilled in the art. Any coupling agent likely to ensure, in the diene rubber compositions usable for the manufacturing of tyres, the effective bonding between a reinforcing inorganic filler such as silica and a diene elastomer, in particular organosilanes or polyfunctional polyorganosiloxanes bearing the functions $U_1$ and $U_2$, may be used.

In particular polysulphurised silanes, which are referred to as "symmetrical" or "¹asymmetrical" depending on their specific structure, are used, such as described for example in applications WO03/002648 and WO03/002649.

Particularly suitable for implementing the invention, without the definition below being limitative, are what are called "symmetrical" polysulphurised silanes which satisfy the following general formula (III):

Q-A-$S_n$-A-Q, in which: (III)

is an integer from 2 to 8 (preferably from 2 to 5);

A is a divalent hydrocarbon radical (preferably $C_1$-$C_{18}$ alkylene groups or $C_6$-$C_{12}$ arylene groups, more particularly $C_1$-$C_{10}$ alkylenes, notably $C_1$-$C_4$ alkylenes, in particular propylene);

Q corresponds to one of the formulae below:

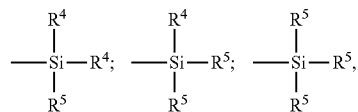

in which:

the radicals $R^4$, which may or may not be substituted, and may be identical or different, represent a $C_1$-$C_{18}$ alkyl group, a $C_5$-$C_{18}$ cycloalkyl group or a $C_6$-$C_{18}$ aryl group (preferably $C_1$-$C_6$ alkyl, cyclohexyl or phenyl groups, in particular $C_1$-$C_4$ alkyl groups, more particularly methyl and/or ethyl);

the radicals $R^5$, which may or may not be substituted, and may be identical or different, represent a hydroxyl group, a $C_1$-$C_{18}$ alkoxyl group or a $C_5$-$C_{18}$ cycloalkoxyl group (preferably a group selected from among hydroxyl, $C_1$-$C_8$ alkoxyls and $C_5$-$C_8$ cycloalkoxyls, more preferably still a group selected from among hydroxyl and $C_1$-$C_4$ alkoxyls, in particular hydroxyl, methoxyl and ethoxyl).

In the case of a mix of polysulphurised silanes of Formula (III) above, in particular the conventional mixs available commercially, the average value of the "n"s is a fractional number, preferably between 2 and 5, more preferably close to 4. However, the invention may also be implemented advantageously for example with disulphurised silanes (n=2).

As examples of polysulphurised silanes, mention will be made more particularly of the polysulphides (in particular disulphides, trisulphides or tetrasulphides) of bis-(($C_1$-$C_4$) alkoxyl-($C_1$-$C_4$)alkylsilyl-($C_1$-$C_4$)alkyl), such as for example bis(3-trimethoxysilylpropyl) or bis(3-triethoxysilylpropyl) polysulphides. Of these compounds, in particular bis(3-triethoxysilylpropyl)tetrasulphide, abbreviated TESPT, of the formula $[(C_2H_5O)_3Si(CH_2)_3S_2]_2$, or bis(triethoxysilylpropyl) disulphide, abbreviated TESPD, of the formula $[(C_2H_5O)_3Si(CH_2)_3S]_2$, are used.

Mention will also be made, as examples of advantageous coupling agents, of the polysulphides (in particular disulphides, trisulphides or tetrasulphides) of bis-(mono($C_1$-$C_4$) alkoxyl-di($C_1$-$C_4$)alkylsilylpropyl), more particularly bis-monoethoxydimethylsilylpropyl tetrasulphide or disulphide as described in application WO02/083782.

As examples of coupling agents other than the aforementioned polysulphurised alkoxysilanes, mention will be made in particular of the bifunctional polyorganosiloxanes, or alternatively the hydroxysilane polysulphides ($R^5$=OH in Formula III above) such as described in applications WO 02/30939 and WO 02/31041.

In the compositions according to the invention, the amount of coupling agent is advantageously less than 10 phr, it being understood that it is generally desirable to use as little as possible thereof. The amount thereof is preferably less than 7 phr, more preferably less than 5 phr, in particular between 0.5 and 4 phr.

The coupling agent could be grafted beforehand (via the "$U_2$" function) on to the diene elastomer of the composition of the invention, the elastomer thus functionalised or "precoupled" then comprising the free "$U_1$" function for the polymer filler. The coupling agent could also be grafted beforehand (via the "$U_1$" function) on to the NAVP filler via its Z function, the filler thus "precoupled" then being able to be bonded to the diene elastomer by means of the free "$U_2$" function. However, it is preferred, in particular for reasons of better processing of the compositions in the uncured state, to use the coupling agent either grafted onto the polymer filler, or in the free (i.e. non-grafted) state.

5. Various Additives

The rubber compositions according to the invention also comprise all or some of the conventional additives usually used in elastomer compositions intended for the manufacture of tyres, such as for example plasticisers or extender oils, whether the latter be aromatic or non-aromatic in nature, pigments, protective agents such as anti-ozone waxes, chemical antiozonants, antioxidants, anti-fatigue agents, reinforcing or plasticising resins, methylene acceptors (for example novolac phenolic resin) or donors (for example HMT or H3M), a cross-linking system based either on sulphur or on sulphur and/or peroxide and/or bismaleimide donors, vulcanisation accelerators and vulcanisation activators.

Preferably, these compositions comprise, as preferred nonaromatic or only very slightly aromatic plasticising agent, at least one compound selected from the group consisting of naphthenic oils, paraffinic oils, MES oils, TDAE oils, glycerol esters (in particular trioleates), hydrocarbon plasticising resins having a high Tg preferably greater than 30° C., and mixs of such compounds. The overall amount of such a preferred plasticising agent is preferably between 10 and 50 phr, more preferably between 20 and 40 phr.

Of these hydrocarbon plasticising resins (it will be recalled that the designation "resin" is reserved by definition for a solid compound), mention will be made in particular of the resins of homopolymers or copolymers of alpha-pinene, beta-pinene, dipentene or polylimonene, C5 fraction, for example of C5 fraction/styrene copolymer or of C5 fraction/C9 fraction copolymer, which are usable alone or in combination with plasticising oils such as MES or TDAE oils.

To the reinforcing filler previously described (i.e. NAVP polymer filler plus carbon black and/or inorganic filler such as HD silica, if applicable) there may be also added, depending on the intended application, inert (non-reinforcing) fillers such as particles of clay, bentonite, talc, chalk, kaolin, usable for example in coloured sidewalls or tyre treads.

These compositions may also contain, in addition to the coupling agents, coupling activators, agents (comprising for example the single $U_1$ function) for covering the reinforcing inorganic filler, or more generally processing aids liable, in known manner, owing to an improvement in the dispersion of the inorganic filler in the rubber matrix and to a reduction in the viscosity of the compositions, to improve their ability to be worked in the uncured state, these agents being, for example, hydrolysable silanes such as alkylalkoxysilanes (in particular alkyltriethoxysilanes), polyols, polyethers (for example polyethylene glycols), primary, secondary or tertiary amines (for example trialkanolamines), hydroxylated or hydrolysable polyorganosiloxanes, for example α,ω-dihydroxy-polyorganosiloxanes (in particular α,ω-dihydroxy-polydimethylsiloxanes).

6. Preparation of the Rubber Compositions

The compositions of the invention are manufactured in suitable mixers, using for example two successive preparation phases in accordance with a general procedure well-known to the person skilled in the art: a first phase of thermo-mechanical working or kneading (sometimes referred to as "non-productive" phase) at high temperature, up to a predetermined maximum temperature (in this case between 110° C. and 190° C., preferably between 120° C. and 170° C.), followed by a second phase of mechanical working (sometimes referred to as "productive" phase) at lower temperature, typically less than 120° C., for example between 60° C. and 100° C., during which finishing phase the cross-linking or vulcanisation system is incorporated.

According to the best-known embodiment, the NAVP nanoparticles are incorporated in the composition of the invention in the form of the masterbatch previously described.

By way of example, all the constituents of the compositions of the invention, with the exception of the vulcanisation system, in particular the NAVP filler in its masterbatch and its coupling agent, are mixed thoroughly, by kneading, during the first, so-called non-productive, phase, that is to say that these different base constituents are introduced into the mixer and kneaded thermomechanically, in one or more steps, until the predefined maximum temperature is reached. The total duration of the kneading, in this non-productive phase, is preferably between 1 and 15 minutes.

After cooling the mix thus obtained during the first, non-productive, phase, the vulcanisation system is then incorporated at low temperature, generally in an external mixer such as an open mill; the entire composition is then mixed (productive phase) for several minutes, for example between 2 and 15 minutes.

The vulcanisation system proper is preferably based on sulphur and an accelerator. Any compound capable of acting as a vulcanisation accelerator for the diene elastomers in the presence of sulphur may be used, in particular those selected from the group consisting of 2-mercaptobenzothiazyl disulphide (abbreviated to "MBTS"), N-cyclohexyl-2-benzothiazyl sulphenamide (abbreviated to "CBS"), N,N-dicyclohexyl-2-benzothiazyl sulphenamide (abbreviated to "DCBS"), N-tert. butyl-2-benzothiazyl sulphenamide (abbreviated to "TBBS"), N-tert. butyl-2-benzothiazyl sulphenimide (abbreviated to "TBSI") and mixs of these compounds. Preferably a primary accelerator of sulphenamide type is used.

To this vulcanisation system there may be added, incorporated during the first, non-productive, phase and/or during the productive phase, various known secondary vulcanisation accelerators or activators such as zinc oxide, fatty acids such as stearic acid, guanidine derivatives (in particular diphenylguanidine), etc. The amount of sulphur is preferably between 0.5 and 3.0 phr, and the amount of the primary accelerator is preferably between 0.5 and 5.0 phr.

The final composition thus obtained is then calendered, for example in the form of a film or a sheet, in particular for characterisation in the laboratory, or alternatively extruded in the form of a rubber profiled element usable for example as a tyre tread for a passenger vehicle.

The vulcanisation (or curing) is carried out in known manner at a temperature generally between 130° C. and 200° C., for a sufficient time which may vary, for example, between 5 and 90 minutes, depending, in particular, on the curing temperature, the vulcanisation system adopted and the vulcanisation kinetics of the composition in question.

Examples of Embodiment

1. Test 1

In the examples of embodiment which follow, two fillers of (Z-)functionalised, cross-linked polymethacrylate are synthesised by free-radical polymerisation of three different monomers—methyl methacrylate (MMA), ethylene glycol dimethacrylate (EGDMA) and filler A: trimethoxysilylpropyl methacrylate (TSPM) or filler B: trimethoxysilylpropyl acrylate (TSPA)—then incorporated in a rubber composition for a tyre in the form of masterbatches obtained by coprecipitation of a latex of the NAVP filler and a latex of a diene elastomer (SBR).

According to one particularly preferred embodiment, the weight ratio of comonomer B bearing the Z function (here, TSPM or TSPA) is of between 20 and 30%, and that of the cross-linking comonomer C (here, EGDMA) is of between 10% and 30%.

A. Synthesis of the Polymethacralate Nanoparticles

The different monomers are subjected beforehand to nitrogen bubbling, as are all the aqueous solutions used with the exception of the solution of SDS (bubbling in powder state). The reaction is carried out in a 1.5 l reactor equipped with a mechanical stirring means. After introduction of 840 ml water and 30 minutes' nitrogen bubbling with stirring, there are introduced in succession 50 ml of a 0.9 mol/l aqueous solution of sodium dodecyl sulphate (SDS) as surfactant, 50 ml of a 1 mol/l equimolar buffer solution of sodium hydrogen phosphate and of ammonium dihydrogen phosphate. To this solution buffered at pH 7, stirred at 350 rpm and heated to 60° C. there is added the monomer filler in the following order:

Filler A: 48.7 g of MMA (or a weight fraction of 47.1%), 29.1 g of EGDMA (weight fraction of 28.1%) then 25.6 g of TSPM (weight fraction of 24.8%).

Filler B: 48.7 g of MMA (or a weight fraction of 47.8%), 29.1 g of EGDMA (weight fraction of 28.6%) then 24.1 g of TSPA (weight fraction of 23.7%).

With vigorous stirring (350 rpm) there is then added to the resulting emulsion 45 ml of an aqueous solution of potassium persulphate (0.125 mol/l). After 60 min at 60° C. with stirring, 18 ml of an aqueous hydroquinone solution (0.5 mol/l) is added to the polymerisation medium. The reaction medium is cooled before mixing with the elastomer (conversion rate, measured by dry extract: filler A: 99%; filler B: 94%).

The functionalised, cross-linked polymethacrylates thus obtained are in the form of a latex comprising approximately 10% by weight of solid (NAVP) and water to make up (approximately 90%).

The filler A latex is characterised in accordance with section I-1-A. The TEM image given in FIG. 1 shows that the nanoparticles (elementary particles) of the invention here are in the form of nanobeads, the majority of which have a diameter of between 20 and 60 nm. The average circular diameter is equal to 34 nm (standard deviation 6 nm).

At this stage, the polymethacrylate (filler A) is isolated and dried to evaluate the amount of (Z-)functionalisation thereof provided by the monomer TSPM, by analysis of the amount of silicon, by proceeding as follows:
- a first step of solubilisation of the sample in aqueous medium by calcination then by alkaline fusion of the ashes obtained;
- a second step of quantitative analysis of the silicon by inductively-coupled plasma atomic emission spectrometry (ICP/AES).

More precisely, operation is as follows: the sample is calcined at 525° C. for 2 hours. The fusion is then carried out on the ash obtained, at 1150° C. (±50° C.) with lithium tetraborate (for example 2 g per 1 g of calcined filler), for approximately 25 min. After cooling, the entire fused bead obtained is solubilised at 80° C. in hydrochloric acid diluted to 2% in water. The solution is then transferred and adjusted in a volumetric flask.

The analysis of the silicon is then carried out, on the contents of the volumetric flask, by ICP/AES: the aqueous solution is delivered into an argon plasma via an introduction system, where it undergoes the phases of desolvation, atomisation then excitation/ionisation of the atoms present. The emission line of the silicon at 251.611 nm is then selected by means of a monochromator, then quantified relative to a calibration curve prepared from a certified standard solution of the corresponding element (the intensity I of the line emitted being proportional to the concentration C of the corresponding element).

The result is expressed in mass % of silicon relative to the dry sample (dried beforehand at 105° C. for 2 hours), in accordance with the formula:

$$\% \text{ Si} = C \cdot V \cdot (100/M)$$

in which:
C=concentration of Si expressed in mg/l;
V=volume of the volumetric flask in l;
M=weight of the sample in mg.

The amount of silicon thus measured is equal to 2.6% (±0.2%), therefore virtually equal to the theoretical amount (namely 2.8%).

The density of the filler A nanoparticles is measured on the powder, using a helium pycnometer: the value obtained is equal to 1.25 g/cm³.

B. Preparation of the Masterbatch

The polymethacrylate latices are then incorporated directly into an SBR diene elastomer to obtain a masterbatch as indicated in section II-2 above. The amount of polymethacrylate filler intended in the masterbatch, as in the intended final rubber composition, is 39 phr (parts by weight per hundred parts of elastomer).

The SBR latex is prepared in a manner known to the person skilled in the art, under the following conditions: polymerisation temperature: 5° C.; surfactant: sodium dodecyl lo sulphate; initiator: iron II salt/hydroperoxide redox system. The conversion is of the order of 50 to 60%. The SBR thus produced has the following characteristics: inherent viscosity at 0.1 g/dl in toluene at 25° C.: 3.11; Mooney viscosity (MS) equal to 67; Tg (DSC)=−52° C.; microstructure: styrene 23.6%, butadiene phase: vinyl 15.0%, trans 70.1%, cis 14.9%.

The quantity of dry matter of the SBR latex is determined by weighing, on a dry extract, before preparing the masterbatch. The SBR latex is diluted to 3 times its volume in water, namely:

Filler A: 652 ml of SBR latex at 177.1 g/l (115.4 g of SBR) and 1304 ml dilution water.

Filler B: 408 ml of SBR latex at 195.9 g/l (80 g of SBR) and 820 ml of dilution water.

Once the syntheses are complete, the polymethacrylate filler latices are cooled to room temperature and then added to the SBR latices diluted to a proportion of 39 phr of filler, i.e.:

Filler A: 497 ml of polymethacrylate filler latex at 90.5 g/l (45 g of filler), Filler B: 368 ml of polymethacrylate filler latex at 84.8 g/l (31.2 g of filler).

The resulting mix is homogenised gently. At a rate of 100 ml/minute, the mix is then added to filler A: 5000 ml; filler B: 3500 ml of methanol stirred at 350 rpm. The precipitate thus obtained is filtered off on filter paper, rinsed with water until there is constant slight residual foaming in the washing water and the washing water tests negative with silver nitrate. The precipitate thus washed is dried under reduced pressure under nitrogen at 60° C. for 3 to 4 days. 156 g (filler A) and 107.7 g (filler B) of dry masterbatch are thus recovered.

C. Preparation of the Rubber Compositions

A control composition (HD silica filler) is prepared in conventional manner, as follows: first of all ("non-productive phase") the SBR elastomer extended beforehand with 37.5 phr of oil and part of the filler are introduced into an internal mixer, the initial tank temperature of which is approximately 90° C. After an appropriate kneading time, of the order of 1 minute, the coupling agent and the remaining part of the filler are added. The other ingredients, with the exception of the vulcanisation system, are added after 2 minutes. The internal mixer is then filled to 75%. Thermomechanical working of a duration of about 6 minutes is then performed, with an average blade speed of 70 rpm, until a dropping temperature of about 135° C. is obtained.

The procedure is identical for a second and third composition, this time incorporating the NAVP filler (polymethacrylate) according to the invention, except that the NAVP filler and the diene elastomer are introduced in a single go from the start, in the form of the masterbatch previously prepared comprising 39 phr of NAVP particles; then the extender oil (37.5 phr of TDAE oil) is incorporated gradually.

After the thermomechanical kneading work, the mix obtained is recovered and cooled, then the vulcanisation system (sulphur and sulphenamide-type primary accelerator) is added on an external mixer at 30° C., by mixing everything ("productive phase") for an appropriate time (between 5 and 12 min).

The compositions thus obtained are then either calendered in the form of plates (thickness of 2 to 3 mm) of rubber in order to measure their mechanical properties, or extruded in the form of a semi-finished product for tyres, for example a tread. Vulcanisation (curing) is carried out at 150° C. for 40 min, under pressure.

D. Comparative Rubber Properties Test

The aim of the test is to compare the performance of the NAVP nanoparticles with that of the conventional inorganic filler (HD silica).

For this, the three compositions prepared in accordance with section C above, the general formulation of which is conventional for high-performance tyre treads, combining low rolling resistance and high wear resistance (passenger-vehicle tyres of low energy consumption known as "Green Tyres"), are compared. The HD silica selected to reinforce the control composition is a tyre-grade silica having in known manner a very high reinforcing ability ("Zeosil" type "1165MP" from Rhodia—density approximately 2.1 g/cm$^3$).

For the control composition, the diene elastomer used is the SBR the synthesis of which is described in section III-2, extended beforehand with 37.5% of TDAE oil (namely 37.5 phr of oil per 100 phr of dry SBR).

The three compositions tested are strictly identical except for the nature of the reinforcing filler:
composition C-1 (control): HD silica;
composition C-2 (invention): Z-functionalised NAVP (TSPM);
composition C-3 (invention): Z-functionalised NAVP (TSPA).

The amount of reinforcing filler was adjusted to equal volume fractions of filler (same volume—namely approximately 19%—of filler in each composition). The specific lo surface area of the polymer filler being lesser, the quantity of TESPT coupling agent introduced into the compositions C-2 and C-3 is therefore lower.

In compositions C-2 and C-3 (invention), the NAVP nanoparticles represent approximately 97% (by volume) of the entire reinforcing filler, the latter comprising a small proportion (2 phr) of carbon black.

Tables 1 and 2 show in succession the formulation of the different compositions (Table 1—amount of the different products expressed in phr), and their properties before and after curing at 150° C. for 40 minutes (Table 2).

Examination of the various results of Table 2 shows, for the compositions C-2 and C-3 according to the invention, compared with the control composition C-1:
in the uncured state, improved vulcanisation kinetics (constant K);
a very significant reduction in the density (measured using a helium pycnometer), of approximately 16% relative to the control composition (difference of course maintained after curing);
after curing, equivalent values of modulus at high deformation (M100, M300, M400), which is a clear indicator to the person skilled in the art of a high level of reinforcement, equivalent to that provided by the reference HD silica;
last but not least, hysteresis properties which, unexpectedly, are very substantially improved, as illustrated by a great reduction in the values of tan($\delta$)$_{max}$ and of $\Delta G^*$, which is a recognised indicator of reduced rolling resistance and heating.

2. Test 2

In the production example that follows, the functionalised (Z) and crosslinked polymethacrylate filler synthesised in paragraph III-1-A (filler B) by radical polymerisation of three different monomers—methyl methacrylate (MMA), ethylene glycol dimethacrylate (EGDMA) and trimethoxysilylpropyl acrylate (TSPA)—is incorporated into a tyre rubber composition in the form of a masterbatch obtained by coprecipitation of the NAVP filler latex and of an NR latex.

A. Preparation of the Masterbatch

The polymethacrylate latex is incorporated directly into natural rubber. The polymethacrylate filler content targeted in the masterbatch is 39 phr (parts by weight per hundred parts of elastomer).

The amount of NR latex dry matter is determined by weighing, on the dry extract, before preparing the masterbatch. The NR latex is diluted threefold with water, i.e. 447 ml of NR latex at 178.8 g/l (80 g of NR) and 900 ml of dilution water.

Once its synthesis is complete, the polymethacrylate filler latex (Filler B synthesised in paragraph III-1-A) is cooled to room temperature and then added to the NR latex diluted to a rate of 39 phr of filler, i.e. 368 ml of polymethacrylate filler latex at 84.8 g/l (31.2 g of filler). The resulting mix is homogenised gently. At a rate of 100 ml/minute, the mix is then added to 3500 ml of methanol stirred at 350 rpm. The precipitate thus obtained is filtered through filter paper, rinsed with water until there is constant slight residual foaming in the washing water and the washing water tests negative with silver nitrate. The precipitate thus washed is dried under reduced pressure under nitrogen at 60° C. for 3 to 4 days. 110 g of dry masterbatch are thus recovered.

B. Rubber Properties Tests

Two compositions of NR rubber are then prepared as indicated previously for Test 1 (dropping temperature of about 145° C.), these two compositions differing only in the nature of their reinforcing filler, as follows:
composition C-4 (control): HD silica,
composition C-5 (invention): TSPA-functionalised NAVP.

As preferential application examples, such rubber compositions are typically used in the parts of road contact systems, especially of tyres, usually using NR-based rubber matrices, for instance the inner safety bearings of tyres, the sidewalls, the bead zones of tyres, the underlayers of treads and also the treads of these tyres, especially for heavy-goods vehicles.

The content of reinforcing filler was adjusted to equal volume fractions of filler (same volume—i.e. about 17%—of filler in each composition). Since the specific surface area of the polymer filler is lower, the amount of TESPT coupling agent introduced into composition C-5 is thus markedly lower. In composition C-5 of the invention, the NAVP filler represents about 97% (by volume) of the total amount of reinforcing filler, the latter comprising a small proportion (1 phr) of carbon black.

Tables 3 and 4 show in succession the formulation of the different compositions (Table 3—amount of the different products expressed in phr), and their properties before and after curing at 150° C. for 25 minutes (Table 4).

Examination of the various results of Table 4 shows, for composition C-5 according to the invention, compared with the control composition C-4:
- in the uncured state, similar scorching safety (Ti) and vulcanisation kinetics (constant K);
- a very significant reduction in the density (approximately −14%);
- after curing, higher values of modulus at very high deformation (see the values for M600), which shows a high level of reinforcement afforded by the NAVP filler, which is at least equivalent if not superior to that afforded by the reference HD silica;
- last but not least, which largely goes to confirm all the preceding results observed with a synthetic diene elastomer (SBR), hysteresis properties that are once again substantially improved (very substantially reduced values of $(\tan(\delta))_{max}$ and of $\Delta G^*$).

In conclusion, the specific polymer filler of the compositions according to the invention, owing to its very greatly reduced density compared with a conventional reinforcing filler such as carbon black or HD silica, makes it possible to reduce very significantly the weight of said composition.

This aim is achieved not only without degradation of the reinforcement, which is synonymous with wear resistance or resistance to cracking, compared with these conventional fillers, but also by permitting a significant reduction in hysteresis, which is synonymous with rolling resistance or heating which are improved still further compared with a conventional reinforcing inorganic filler such as an HD silica.

Finally, one notable advantage of the NAVP filler must be emphasised: since the density of the polymeric matrix becomes substantially equal to that of the NAVP filler itself, it thus becomes possible to increase the amount of reinforcing filler without increasing the density of said polymeric matrix.

TABLE 1

| Composition No. | C-1 | C-2 | C-3 |
| --- | --- | --- | --- |
| SBR (1) | 100 | 100 | 100 |
| HD silica (2) | 77 | — | — |
| NAVP filler (3) | — | 39 | — |
| NAVP filler (8) | — | — | 39 |
| coupling agent (4) | 6.2 | 1.8 | 1.8 |
| carbon black (N234) | 2 | 2 | 2 |
| oil (5) | 37.5 | 37.5 | 37.5 |
| ZnO | 2.5 | 2.5 | 2.5 |
| stearic acid | 2 | 2 | 2 |
| antioxidant (6) | 1.9 | 1.9 | 1.9 |
| sulphur | 1.5 | 1.5 | 1.5 |
| accelerator (7) | 2.5 | 2.5 | 2.5 |

(1) SBR elastomer (synthesis described in section III-B);
(2) HD silica ("Zeosil" type "1165MP" from Rhodia);
(3) Z-functionalised NAVP (synthesis as in section III-A: Filler A);
(4) TESPT ("Si69" from Degussa);
(5) TDAE extender oil ("Vivatec 500" from Klaus Dahleke);
(6) N-1,3-dimethylbutyl-N-phenylparaphenylenediamine ("Santoflex 6-PPD" from Flexsys);
(7) N-cyclohexyl-2-benzothiazylsulphenamide ("Santocure CBS" from Flexsys);
(8) Z-functionalised NAVP (synthesis as in section III-A: Filler B)

TABLE 2

| Composition No. | C-1 | C-2 | C-3 |
| --- | --- | --- | --- |
| Properties before curing: | | | |
| K (min$^{-1}$) | 0.105 | 0.151 | 0.217 |
| density (g/cm$^3$) | 1.19 | 1.01 | 1.02 |
| Properties after curing: | | | |
| M100 (MPa) | 3.5 | 3.5 | 4.8 |
| M300 (MPa) | 11.1 | 10.6 | 13.3 |
| M400 (MPa) | 17.0 | 17.0 | 18.8 |
| ΔG* | 5.6 | 0.8 | 1.2 |
| $\tan(\delta)_{max}$ | 0.300 | 0.185 | 0.187 |

TABLE 3

| Composition No. | C-4 | C-5 |
| --- | --- | --- |
| NR (1) | 100 | 100 |
| HD silica (2) | 50 | — |
| NAVP filler (3) | — | 25.7 |
| carbon black (N234) | 1 | 1 |
| coupling agent (4) | 4 | 1.16 |
| ZnO | 3 | 3 |
| stearic acid | 2.5 | 2.5 |
| antioxidant (5) | 1.5 | 1.5 |
| sulphur | 1.5 | 1.5 |
| accelerator (6) | 1.8 | 1.8 |

(1) natural rubber;
(2) HD silica ("Zeosil" type "1165MP" from Rhodia);
(3) TSPA-functionalised NAVP (synthesised according to paragraph III- 1-A, filler B);
(4) TESPT ("Si69" from Degussa);
(5) N-1,3-dimethylbutyl-N-phenylparaphenylenediamine ("Santoflex 6-PPD" from Flexsys);
(6) N-cyclohexyl-2-benzothiazylsulphenamide ("Santocure CBS" from Flexsys)

TABLE 4

| Composition No. | C-4 | C-5 |
| --- | --- | --- |
| Properties before curing: | | |
| K (min$^{-1}$) | 0.327 | 0.307 |
| density (g/cm$^3$) | 1.16 | 1.00 |
| Properties after curing: | | |
| M100 (MPa) | 3.9 | 4.8 |
| M300 (MPa) | 13.2 | 13.0 |
| M400 (MPa) | 19.1 | 19.9 |
| M600 (MPa) | 25.8 | 28.8 |
| ΔG* | 2.51 | 1.31 |
| $\tan(\delta)_{max}$ | 0.199 | 0.144 |

The invention claimed is:

1. A rubber composition based on at least one diene elastomer, a polymer filler, a coupling agent providing the bond between the polymer filler and the at least one diene elastomer, wherein said polymer filler comprises nanoparticles of non-aromatic vinyl polymer bearing a function "Z" of formula ≡Si—X, X representing a hydroxyl or hydrolysable group.

2. A composition according to claim 1, the non-aromatic vinyl polymer being a homopolymer of non-aromatic vinyl monomer or a copolymer at least the majority weight fraction of which is non-aromatic vinyl.

3. A composition according to claim 1, the non-aromatic vinyl polymer being a homopolymer or copolymer of acrylate or methacrylate.

4. A composition according to claim 1, X being a halogen.

5. A composition according to claim 4, X being chlorine.

6. A composition according to of claim 1, wherein X corresponds to the formula OR, wherein R represents hydrogen or a straight-chain or branched monovalent hydrocarbon group.

7. A composition according to claim 1, wherein X corresponds to the formula OR, wherein R is selected from the group consisting of hydrogen, alkyls, alkoxyalkyls, cycloalkyls and aryls comprising from 1 to 15 carbon atoms.

8. A composition according to claim 7, wherein R is selected from the group consisting of hydrogen, $C_1$-$C_8$ alkyls, $C_2$-$C_8$ alkoxyalkyls, $C_5$-$C_{10}$ cycloalkyls and $C_6$-$C_{12}$ aryls.

9. A composition according to claim 1, wherein Z corresponds to one of the formulae:

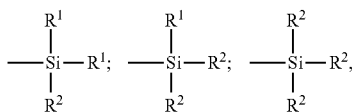

wherein:
the radicals $R^1$, which may or may not be substituted, and which may be identical or different, are selected from the group consisting of $C_1$-$C_8$ alkyls, $C_5$-$C_8$ cycloalkyls and $C_6$-$C_{12}$ aryls;
the radicals $R^2$, which may or may not be substituted, and which may be identical or different, are selected from the group consisting of hydroxyl, $C_1$-$C_8$ alkoxyls and $C_5$-$C_8$ cycloalkoxyls.

10. A composition according to claim 9, the radicals $R^1$ being selected from the group consisting of $C_1$-$C_4$ alkyls, cyclohexyl and phenyl.

11. A composition according to claim 10, the radicals $R^1$ being selected from the group consisting of $C_1$-$C_4$ alkyls.

12. A composition according to claim 9, the radicals $R^2$ being selected from the group consisting of hydroxyl and $C_1$-$C_6$ alkoxyls.

13. A composition according to claim 12, the radicals $R^2$ being selected from the group consisting of hydroxyl and $C_1$-$C_4$ alkoxyls.

14. A composition according to claim 9, the radicals $R^1$ being selected from among methyl and ethyl and the radicals $R^2$ being selected from among hydroxyl, methoxyl and ethoxyl.

15. A composition according to claim 1, the non-aromatic vinyl polymer being a copolymer of at least one first, non-aromatic vinyl monomer (denoted "monomer A") and at least one second, functionalised, monomer (denoted "monomer B") bearing the function Z of formula ≡Si—X.

16. A composition according to claim 15, the monomer A bearing one or more function(s) polymerisable by free-radical polymerisation.

17. A composition according to claim 16, the monomer A corresponding to Formula (II):

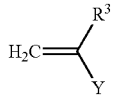

in which:
the radical $R^3$ is selected from the group consisting of hydrogen, $C_1$-$C_8$ alkyls and $C_5$-$C_8$ cycloalkyls;
the radical Y is selected from the group consisting of halogens, the radicals OH, OR', SR', C≡N, C(O)OH, C(O)OR', C(O)N(R'R''), C(O)R' and OC(O)R' in which R' and R'', which may be identical or different, are selected from the group consisting of alkyls comprising from 1 to 12 carbon atoms, and aryls, aralkyls or alkaryls comprising from 6 to 20 carbon atoms.

18. A composition according to claim 17, Formula (II) satisfying the following characteristics:
$R^3$ is selected from the group consisting of hydrogen and $C_1$-$C_4$ alkyls;
Y is selected from the group consisting of chlorine, the radicals C(O)OH, C(O)OR', C(O)N(R'R'') and OC(O)R'.

19. A composition according to claim 18, wherein Formula (II) satisfies the following characteristics:
$R^3$ is hydrogen or methyl;
Y is the C(O)OR' group wherein R' is an alkyl comprising from 1 to 8 carbon atoms.

20. A composition according to claim 19, the monomer A being selected from the group consisting of methyl acrylate, methyl methacrylate, ethyl acrylate, ethyl methacrylate, n-butyl acrylate, n-butyl methacrylate, tert. butyl acrylate, tert. butyl methacrylate, hydroxyethyl acrylate, hydroxyethyl methacrylate and mixs of these compounds.

21. A composition according to claim 20, wherein the monomer A is selected from the group consisting of methyl acrylate or methyl methacrylate.

22. A composition according to claim 15, the monomer B being selected from the group consisting of hydroxysilyl-($C_1$-$C_4$) alkyl acrylates, hydroxysilyl-($C_1$-$C_4$) alkyl methacrylates, ($C_1$-$C_4$) alkoxysilyl-($C_1$-$C_4$) alkyl acrylates, ($C_1$-$C_4$) alkoxysilyl-($C_1$-$C_4$) alkyl methacrylates and mixs of these compounds.

23. A composition according to claim 22, the monomer B being selected from the group consisting of hydroxysilyl-($C_1$-$C_4$) alkyl acrylates, hydroxysilyl-($C_1$-$C_4$) alkyl methacrylates, methoxysilyl-($C_1$-$C_4$) alkyl acrylates, methoxysilyl-($C_1$-$C_4$) alkyl methacrylates, ethoxysilyl-($C_1$-$C_4$) alkyl acrylates, ethoxysilyl-($C_1$-$C_4$) alkyl methacrylates and mixs of these compounds.

24. A composition according to claim 23, the monomer B being selected from the group consisting of hydroxysilylpropyl acrylates, hydroxysilylpropyl methacrylates, methoxysilylpropyl acrylates, methoxysilylpropyl methacrylates, ethoxysilylpropyl acrylates, ethoxysilylpropyl methacrylates and mixs of these compounds.

25. A composition according to claim 24, wherein the comonomer B is trimethoxysilylpropyl acrylate or trimethoxysilylpropyl methacrylate.

26. A composition according to claim 15, the comonomer B being selected from the group consisting of styryl-($C_1$-$C_4$) alkyl-hydroxysilanes, styryl-($C_1$-$C_4$) alkyl-($C_1$-$C_4$) alkoxysilanes and mixs of these compounds.

27. A composition according to claim 26, the comonomer B being selected from the group consisting of styryl-($C_1$-$C_4$) alkyl-hydroxysilanes, styryl-($C_1$-$C_4$) alkyl-methoxysilanes, styryl-($C_1$-$C_4$) alkyl-ethoxysilanes and mixs of these compounds.

28. A composition according to claim 27, the comonomer B being selected from the group consisting of styrylethylhydroxysilanes, styrylethylmethoxysilanes, styrylethylethoxysilanes and mixs of these compounds.

29. A composition according to claim 28, the comonomer B being styrylethyltrimethoxysilane.

30. A composition according to claim 15, the molar ratio of comonomer B in said non-aromatic vinyl polymer being greater than 5%.

31. A composition according to claim 30, the molar ratio of comonomer B in said non-aromatic vinyl polymer being between 5 and 30%.

32. A composition according to claim 31, the molar ratio of comonomer B in said non-aromatic vinyl polymer being between 5 and 20%.

33. A composition according to claim 1, wherein the non-aromatic vinyl polymer is cross-linked by the presence of at least one at least bifunctional cross-linking comonomer (denoted "monomer C"), which is polymerisable by addition reaction.

34. A composition according to claim 33, the monomer C bearing at least two polymerisable unsaturated groups.

35. A composition according to claim 34, the polymerisable unsaturated groups being ethylene groups.

36. A composition according to claim 33, the monomer C being selected from the group consisting of polyol diacrylates, polyol triacrylates, polyol dimethacrylates, polyol trimethacrylates, alkylene diacrylamides, alkylene dimethacrylamides, vinyl aromatic compounds bearing at least two vinyl groups, and mixs of these compounds.

37. A composition according to claim 36, the monomer C being a styrene compound.

38. A composition according to claim 37, the styrene compound being selected from the group consisting of diisopropenylbenzene, divinylbenzene, trivinylbenzene and mixs of these compounds.

39. A composition according to claim 36, the comonomer C being selected from the group consisting of polyol diacrylates, polyol dimethacrylates and mixs of these compounds.

40. A composition according to claim 39, the comonomer C being selected from the group consisting of ethylene glycol diacrylate, ethylene glycol dimethacrylate, propylene glycol diacrylate, propylene glycol dimethacrylate, hexamethylene glycol diacrylate, hexamethylene glycol dimethacrylate and mixs of these compounds.

41. A composition according to claim 33, the weight ratio of comonomer C in said non-aromatic vinyl polymer being greater than 5%.

42. A composition according to claim 41, the weight ratio of monomer C in said non-aromatic vinyl polymer being between 10 and 30%.

43. A composition according to claim 15, the weight ratio of monomer B being between 10 and 30%.

44. A composition according to claim 43, the weight ratio of monomer B being between 20 and 30%.

45. A composition according to claim 1, the non-aromatic vinyl polymer being obtained by free-radical polymerisation.

46. A composition according to claim 1, the average diameter of the nanoparticles being between 10 and 100 nm.

47. A composition according to claim 46, the average diameter of the nanoparticles being between 10 and 60 nm.

48. A composition according to claim 33, the non-aromatic vinyl polymer being a copolymer of methyl methacrylate (monomer A), trimethoxysilylpropyl methacrylate (monomer B) and ethylene glycol dimethacrylate (monomer C).

49. A composition according to claim 1, the diene elastomer being selected from the group consisting of polybutadienes, synthetic polyisoprenes, natural rubber, butadiene/styrene copolymers, butadiene/isoprene copolymers, butadiene/acrylonitrile copolymers, isoprene/styrene copolymers, butadiene/styrene/isoprene copolymers and mixs of these elastomers.

50. A composition according to claim 1, the coupling agent being a silane or a polysiloxane which is at least bifunctional.

51. A composition according to claim 1, the amount of non-aromatic vinyl polymer filler being between 10 and 100 phr.

52. A composition according to claim 51, the amount of non-aromatic vinyl polymer filler being between 10 and 80 phr.

53. A composition according to claim 52, the amount of non-aromatic vinyl polymer filler being between 20 and 50 phr.

54. A process for obtaining a rubber composition in which there are incorporated in at least one diene elastomer at least one polymer filler, a coupling agent providing the bond between the polymer filler and the at least one diene elastomer, and wherein the entire mix is kneaded thermomechanically, in one or more steps, until a maximum temperature of between 110° C. and 190° C. is reached, comprising incorporating said polymer filler such that it comprises nanoparticles of functionalised non-aromatic vinyl polymer =Si—X, X representing a hydroxyl or hydrolysable group.

55. A process according to claim 54, the polymer filler being incorporated in the form of a masterbatch of said filler and of at least one diene elastomer.

56. A masterbatch based on at least one diene elastomer and a polymer filler, characterised in that said polymer filler comprises nanoparticles of non-aromatic vinyl polymer bearing a function "Z" of formula =Si—X, X representing a hydroxyl or hydrolysable group.

57. A process for obtaining a masterbatch according to claim 56 comprising at least one diene elastomer and a polymer filler, comprising the following steps:
    starting from a latex of the diene elastomer and a latex of the polymer filler;
    mixing them thoroughly;
    precipitating the mix thus obtained;
    then washing and drying the precipitate thus obtained,
characterised in that said polymer filler comprises nanoparticles of non-aromatic vinyl polymer bearing a function Z of formula =Si—X, X representing a hydroxyl or hydrolysable group.

58. A method for the manufacture of a diene elastomer composition, comprising
    incorporating a coupling agent into the masterbatch of claim 56, and
    thermomechanically kneading the resulting mixture.

59. A method for the manufacture of articles or semi-finished products made of rubber, comprising:
    adding a coupling agent to the rubber composition according to claim 1;
    thermomechanically kneading the resulting mixture;
    adding a vulcanization system to the thermomechanically kneaded mixture; and
    forming a vulcanized rubber.

60. An article or semi-finished product made of rubber comprising a composition according to claim 1 that has been vulcanized.

61. An article or semi-finished product made of rubber according to claim 60, this article or semi-finished product being selected from the group consisting of tyres, internal safety supports for tyres, wheels, rubber springs, elastomeric joints, and other suspension and anti-vibration elements.

62. A tyre comprising a rubber composition according to claim 1.

63. A semi-finished product for tyres comprising a rubber composition in accordance with claim 1.

64. A semi-finished product for tyres according to claim 63, from the group consisting of treads, underlayers for treads, crown reinforcement plies, sidewalls, carcass reinforcement plies, beads, protectors, inner tubes, airtight internal rubbers for tubeless tyres, internal sidewall reinforcement rubbers and other rubbers intended for bearing the load in the event of travelling on a flat tyre.

* * * * *